Aug. 19, 1930.  E. J. POMMER  1,773,545
UNIVERSAL FASTENER
Filed Sept. 30, 1929
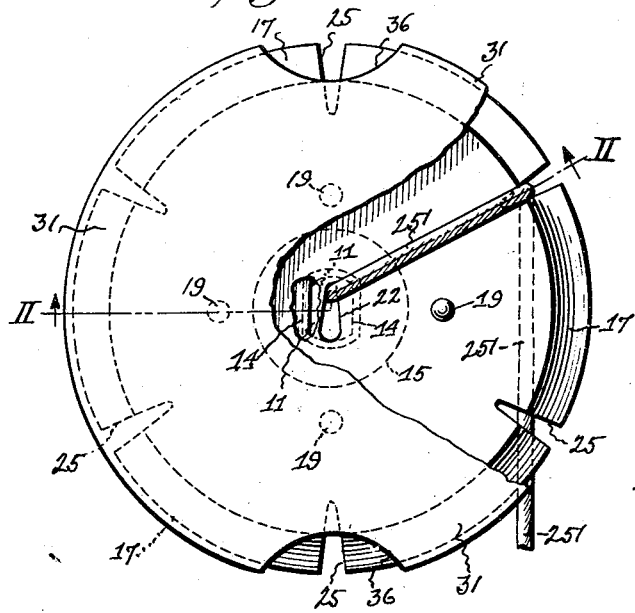
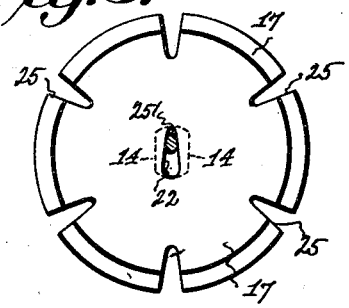
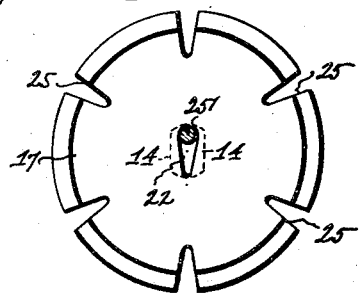
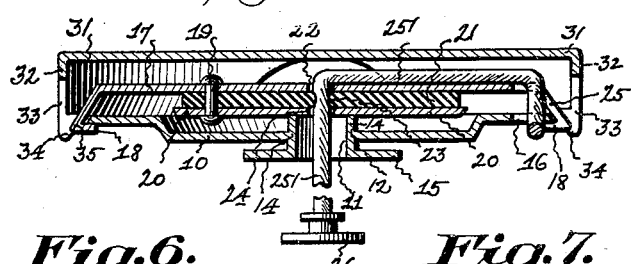
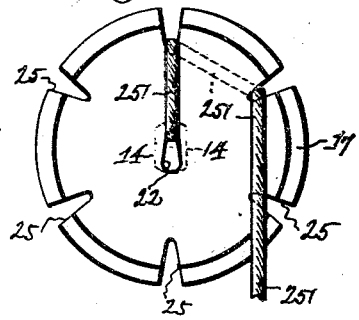
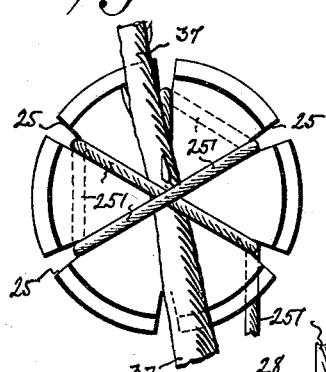
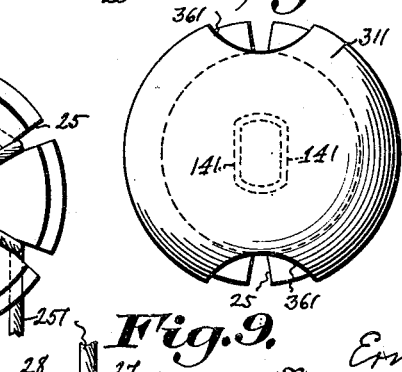
Inventor
Ernesto Jose Pommer,
W. Schonborn,
Attorney Patented Aug. 19, 1930

1,773,545

UNITED STATES PATENT OFFICE

ERNESTO JOSÉ POMMER, OF BUENOS AIRES, ARGENTINA

UNIVERSAL FASTENER

Application filed September 30, 1929. Serial No. 396,018.

My invention relates to fasteners which are particularly adapted to be used in connection with a tape, cord, or the like flexible medium and a coacting fastener element and capable of being universally employed wherein an adjustable or variable length or loop of tape, cord, or the like can be securely clamped or connected to the fastener without the use of knotting and said loop can be quickly released and readjusted and secured with a minimum number of operations.

The object of the invention is to provide a fastener capable of being used for many purposes in which a variable length of loop can be quickly secured with a minimum number of cooperating parts and acts of manipulation at a low cost of manufacture and assembling.

A further object of the invention is to provide a fastener which is capable of being used as a cuff button, flower holder, or clamp, and other uses wherein the distance between the end of the tape or cord and the coacting fastener can be made variable and tightly secured, or the section of the tape or cord attached or secured on the coacting fastener will be firmly held in contact with the surface of the coacting fastener for various purposes, to be hereinafter more fully disclosed.

Other objects and advantages of the invention will appear from the detailed description of the construction and arrangement of the several elements of the invention and manner of their cooperation and using the same.

The invention consists of structural characteristics and relative arrangement of elements which will be hereinafter more fully described and particularly pointed out in the appended claims.

In the one sheet of drawings, in which similar reference characters indicate the same parts in the several figures, Figure 1 is an enlarged top plan, partly broken away, of the invention;

Figure 2 is a central vertical section on line II—II of Figure 1;

Figure 3 is a top plan view with the cover removed and on a reduced scale, showing diagrammatically one of the adjusted positions of the fastening elements;

Figure 4 is a top plan view similar to Figure 3, when one of the cooperating parts of the fastener has been rotated one hundred eighty degrees with respect to the other;

Figure 5 is a view similar to Figure 3, showing the manner of arranging the lacing and securing the flexible fastening medium;

Figure 6 is a view similar to Figure 3, showing the manner of securing the stem of a flower to the fastener;

Figure 7 is a top plan view of the invention in the form of a button;

Figure 8 is a side view of the button shown in Figure 7; and,

Figure 9 is a modified form of the means for removably securing an end of the flexible medium to a disk.

Referring to Figures 1 to 6, inclusive, of the drawings, 10 is a disk-shaped element, preferably dished, as shown, and provided with a central elongated opening 11 formed within a shank portion 12 having opposite flat sides 14 and 14 adapted to be inserted in a button or other flexible hole to prevent the same from rotating, said shank portion 12 terminating on its outer side with an annular flange 15. The outer periphery of said disk 10 is provided with a series of equally spaced wedge-shaped slots 16.

A second dish-shaped disk 17 is superimposed and rotatably mounted on said first mentioned disk 10 and held thereon by an inturned peripheral flange 18, as clearly shown in Figure 2. Said disk 17 has secured to its underside by means of rivets 19, or other similar expedient, an inner plate 20 supporting a rubber pad 21, and each of said disk 17, plate 20, and pad 21, is provided with a wedge-shaped opening 22, 23, and 24, which are in line and register with the elongated opening 11 of the disk 10. Said disk 17 is also provided with a series of equally spaced peripheral wedge-shaped slots 25, which are so spaced and arranged to register with the slots 16 of disk 10.

The wedge-shaped opening 23 in the rubber pad 21 is made slightly smaller than the openings 22 and 24 in the disk 17 and inner plate 20 in order to adapt said pad 21 to have a frictional engagement with a flexible medium, cord, or tape 251 laced through said openings 22, 23 and 24, as indicated in Figure 2. One end of said tape 251 is preferably provided with and has secured thereto a button 26, as shown, or said tape end can be passed through an opening 27 of a perforated button 28 and made to be engaged or pierced by a pin 29 carried by said button 28, after which the free end of said pin 29 is bent down, as shown in dotted lines in Figure 9, and made to pass under a retaining catch 30, similar in construction and operation to that of a safety pin.

31 is a dish-shaped cover provided with a flange 32 having a series of upright slits 33 and a slightly inturned edge or bead 34 adapted to snap over and engage the peripheral edge 35 of the disk 17, as shown in Figure 2, and form a cover and finish to the fastener. Said cover is also provided with diagrammatically opposed arc-shaped incisions 36 to form openings through which the stem 57 of a flower, flag, or other decoration may pass when secured, as shown in Figure 6, for example.

Figures 6, 7 and 8 show substantially the same construction as shown in Figures 1 and 2, as applied for the use of a flower holder, in which the same is made more in the shape of a cuff button provided with shank portion 121 having opposed flat faces 141 and 141, flange portion 151, and cover 131 provided with arc-shaped incisions 361. Figure 6 shows a stem of a rose 37 held by the flexible medium 251 and after the cover 131 is adjusted in place said stem will appear at the incisions 361 and the flexible medium or cord 251 and its loose end will be invisible and under the cover 311, as shown, for example, in Figure 2, said cover may be provided with any desired ornamentation, insignia of different fraternal, or political organizations.

The manner of using the invention is as follows:

The parts of the fastener being assembled, as shown, and its cover being removed, the end of the cord or tape 251 is preferably first passed through the elongated opening 11 and then through the wedge-shaped openings 24, 23, and 22 of the parts or disks 10 and 17, and in order to secure the cord or tape 251 it is forced or laterally moved so that it will be wedged between the converging walls or sides of the wedge-shaped openings 22, 23, and 24 and frictionally engaged by the rubber pad 21. After one end of the tape or cord 251 is secured, as just described, the other or free portion of said tape or cord can be laced back and forth by engagement with the wedge-shaped slots 16 and 25 of said disks 10 and 17, as shown in Figure 6.

If it is desired to release the tape or cord 251 from its engagement with the disk 17 and side or wedge sections of the openings 22, 23, and 24, the section of the tape or cord engaging the slots 16 and 25 is first made free and the disk 10 is held stationary by holding the same or by the shank portion 12 engaging the button hole when the rotatable disk 17 is rotated which causes the inner walls of the elongated opening 11 corresponding to the flat sides 14, 14, to engage the flexible medium tape or cord 251 and force the same towards the enlarged end of the openings 22, 23, and 24, as shown in Figure 4, so as to be free for other adjustments and can again be made to assume the position shown in Figure 3.

From the foregoing description of the construction and arrangement of the elements and manner of using the improved device, it will be seen that all the objects and advantages recited in the statement of invention have been fully and efficiently carried out, and many changes will readily suggest themselves to any one without departing from the spirit of the present invention or scope of the claims, as, for example, the cooperating disks may be of any shape or configuration and the shank may also be of any shape to prevent rotation or engagement with the cuff button holes of a shirt or other garment.

What I claim is:

1. A universal fastener element to be employed in securing a flexible fastening medium, said element comprising a disk having an elongated opening, and a second disk superimposed and rotatably secured to said first disk and having a wedge-shaped opening registering with and adapted to vary its relation with respect to said elongated opening.

2. A universal fastener element to be employed in securing a flexible fastening medium, said element comprising a circular disk having a central elongated opening, and a second circular disk superimposed and rotatably secured to said first disk and having a wedge-shaped opening registering with and adapted to vary its relation with respect to said central elongated opening.

3. A universal fastener element to be employed in securing a flexible fastening medium, said element comprising a disk having an elongated opening, a second disk superimposed and rotatably secured to said first disk and having a wedge-shaped opening registering with and adapted to vary its relation with respect to said elongated opening, each of said disks being provided with a series of separated radially arranged peripheral slots capable of registering with each other and adapted to receive and hold the flexible medium passed through said elongated opening of said first disk and clamped or secured in said wedge-shaped opening of said second disk.

4. A universal fastener element to be employed in securing a flexible fastening medium, said element comprising a circular disk having a central elongated opening, a second circular disk superimposed and rotatably secured to said first disk and having a wedge-shaped opening registering with and adapted to vary its relation with respect to said central elongated opening, each of said circular disks being provided with a series of separated radially arranged wedge-shaped peripheral slots capable of registering with each other and adapted to receive and hold the flexible medium passed through said elongated opening of said first disk and clamped or secured in said wedge-shaped opening of said second disk.

5. A universal fastener element to be employed in securing a flexible fastening medium, said element comprising a disk provided with a shank and flange and having an elongated opening through said shank, and a second disk superimposed and rotatably secured to said first disk and having a wedge-shaped opening registering with and adapted to vary its relation with respect to said elongated opening.

6. A universal fastener element to be employed in securing a flexible fastening medium, said element comprising a circular disk provided with an irregular shank and having a central elongated opening through said shank, a flange on said shank, and a second circular disk superimposed and rotatably secured to said first disk and having a wedge-shaped opening registering with and adapted to vary its relation with respect to said central elongated opening.

7. A universal fastener element to be employed in securing a flexible fastening medium, said element comprising a circular disk provided with an irregular shank and having a central elongated opening through said shank, a flange on said shank, a second circular disk superimposed and rotatably secured to said first disk and having a wedge-shaped opening registering with and adapted to vary its relation with respect to said central elongated opening, and a cover detachably secured over said disks.

8. A universal fastener element to be employed in securing a flexible fastening medium, said element comprising a disk provided with a shank and flange and having an elongated opening through said shank, and a second disk superimposed and rotatably secured to said first disk and having a wedge-shaped opening provided with a frictional lining and registering with and adapted to vary its relation with respect to said elongated opening.

In testimony whereof, I hereunto affix my signature.

ERNESTO JOSÉ POMMER.